July 7, 1931. B. P. GRAVES 1,812,871
VARIABLE SPEED CONTROLLER MECHANISM
Filed Jan. 20, 1928 2 Sheets-Sheet 2
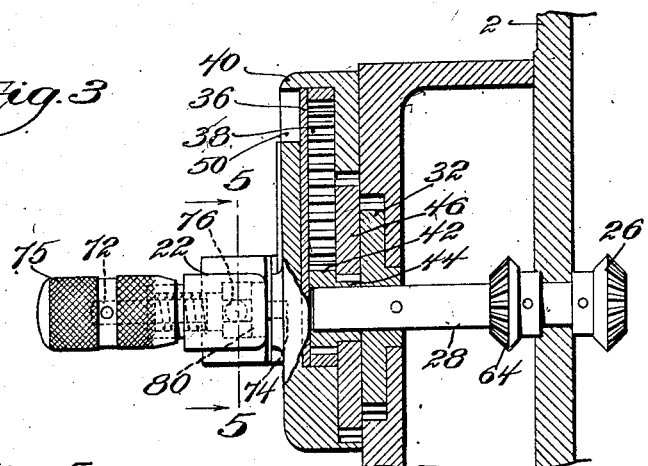
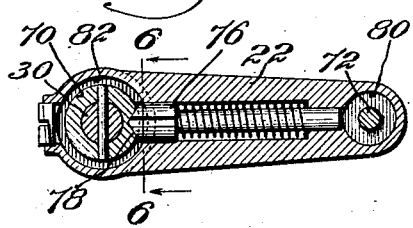
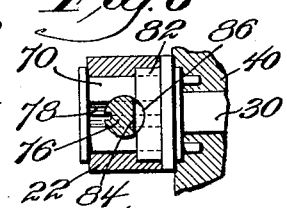
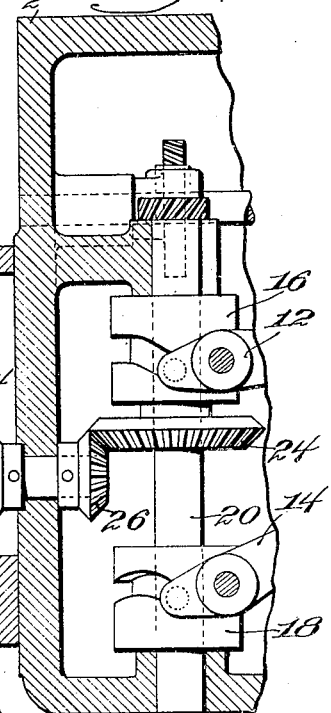
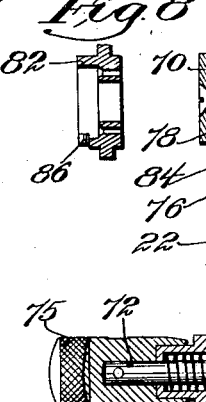
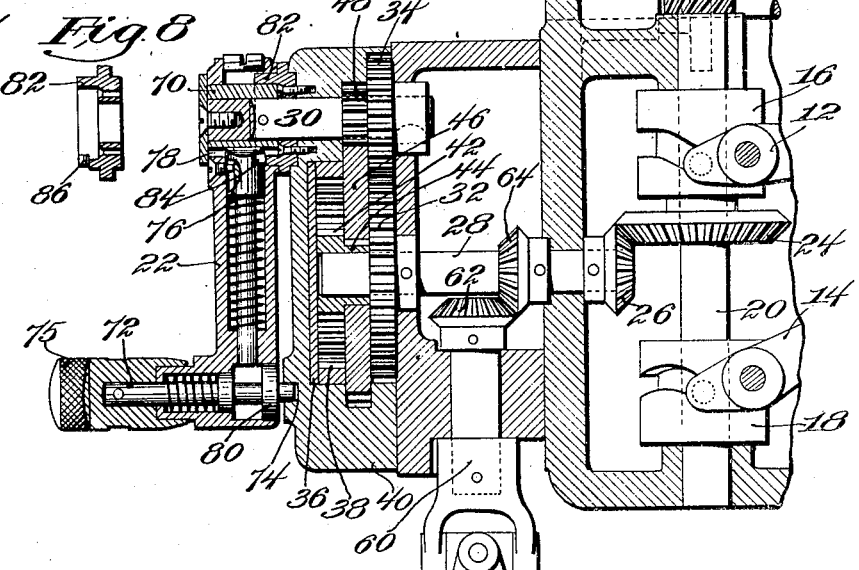
Witness
Jas. J. Maloney.
Inventor
Benjamin P. Graves
by Van Everen Fish
Hildreth Heany Patented July 7, 1931

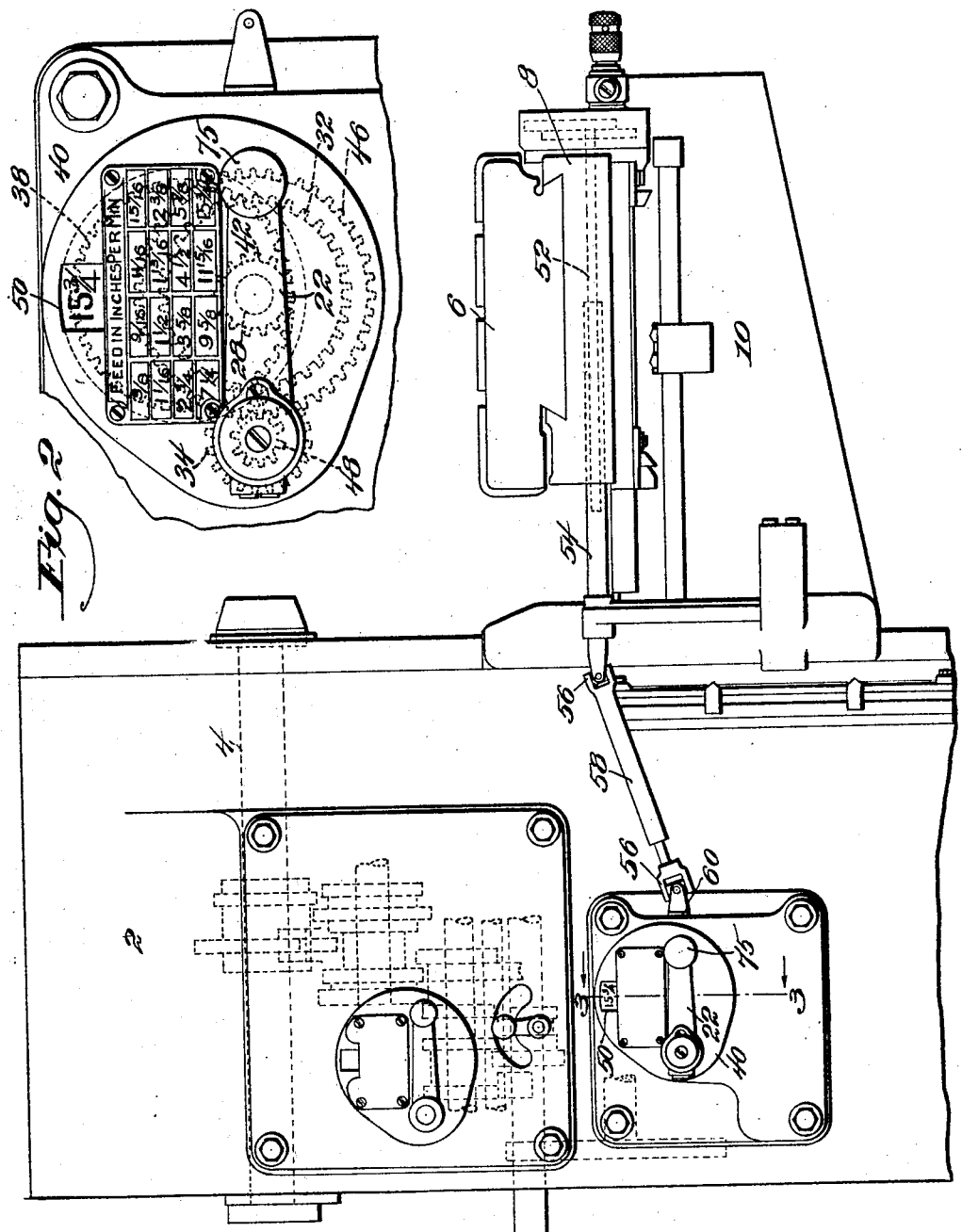

1,812,871

UNITED STATES PATENT OFFICE

BENJAMIN P. GRAVES, OF CRANSTON, RHODE ISLAND, ASSIGNOR TO BROWN AND SHARPE MANUFACTURING COMPANY, A CORPORATION OF RHODE ISLAND

VARIABLE SPEED CONTROLLER MECHANISM

Application filed January 20, 1928. Serial No. 248,137.

The invention relates to improvements in variable speed controller mechanisms particularly adapted for use on milling machines and machines of similar types employing a variable speed driving mechanism in which two or more sets of controller devices are provided at different points on the machine to enable the operator readily to set the mechanism for the desired speed without moving about the machine.

The invention is herein disclosed as embodied in a change speed controller and indicator mechanism which is adapted for use in a milling machine of the column and knee type and comprises two sets of rotary controllers and indicator dials for the table feed, one being mounted at the side on the machine column and the other on the front of the saddle. The two sets of controllers are interconnected so that when one controller arm is rotated by the operator both indicator dials are properly set to indicate the change of speed.

As ordinarily constructed, these rotary controller arms are rotated through a predetermined angle to secure each change of speed, being held yieldingly in position by the engagement of spring plungers mounted on the arms with recesses formed on relatively stationary parts of the machine. When an arm is turned by the operator the spring plunger on each arm slides out of its recess and then falls into a new recess as the arms are brought exactly to the desired position. However, due to the play in the connections between the two sets of controls, difficulty has been experienced in bringing the second rotary controller arm exactly into position so that its spring plunger may register with the corresponding recess and the indicator dial be set to designate the correct operating speed.

In carrying out the present invention, a simple and efficient mechanism is provided to enable the operator to bring both sets of control devices into their desired position quickly and certainly by turning either one of the rotary controller arms. For convenience and ease of operation in setting the variable speed mechanism, the arm being manipulated by the operator is given a complete revolution for each change of speed so that each arm is always returned to the same rest position. With the present construction the remaining arm is disconnected from the controller and indicator mechanism associated therewith and is held locked in rest position out of engagement with the gear shifting mechanism so that it becomes unnecessary to center this inactive arm carefully in locking position after each change of speed. At the same time, mechanism is provided to bring the change speed controller and indicator mechanism associated with the inactive arm into register with that which is being manipulated by the operator to indicate correctly the operating speed.

The several features of the invention consist also in the devices, combinations and arrangement of parts hereinafter described and claimed and together with the advantages to be obtained thereby should be readily understood by one skilled in the art from the following description taken in connection with the accompanying drawings in which Fig. 1 is a view in side elevation of a portion of a milling machine of the column and knee type illustrating the preferred embodiment of the invention; Fig. 2 is a detail view on an enlarged scale of the rotary controller and indicator mechanism for the table feed mounted on the machine column, as shown in Fig. 1; Fig. 3 is a front sectional view of the controller and indicator mechanism taken on the line 3—3 of Fig. 1; Fig. 4 is a sectional view of the rotary controller and indicator mechanism and the operating cams for the change speed gears for the table feed; Fig. 5 is a detail sectional view taken on the line 5—5 of Fig 3 illustrating particularly the connections of the rotary controller lever with the change speed and indicator mechanisms; Fig. 6 is a sectional view taken on the line 6—6 of Fig. 5; Fig. 7 is a detail view in front elevation of the locking ring shown in section in Fig. 5; and Fig. 8 is a detail sectional view of the locking ring looking from the right in Fig. 7.

In the drawings the invention is shown embodied in a milling machine of the column and knee type such for instance as is illustrated in the patent to Benjamin P. Graves, dated January 15, 1924, No. 1,480,900. In this machine the fixed machine base includes a column 2, in which the spindle 4 is mounted. The work is carried on a work supporting table 6 mounted for longitudinal movement in a supporting saddle 8 which is in turn mounted for transverse movement on a supporting knee 10 and this is mounted for vertical movement on the column 2 as is usual in this type of machine. The spindle and work supporting table are relatively moved by one or both of two variable speed mechanisms through one of which variable feeding movements are imparted to the table and through the other of which the spindle is rotated at variable speeds. These mechanisms are mounted in and supported by the fixed column and each may be adjusted by a controller element mounted on the left side of the column and conveniently accessible by the operator when standing at this side of the column at the rear of the table. The mechanism through which each of these variable speed mechanisms are adjusted is also connected with a similar controller mounted upon the front of the saddle where it is within convenient reach of the operator when at the front of the machine. Associated with each controller element for the variable table feed mechanism is an indicator which brings to view the rate of feed in inches per minute corresponding to each setting of the controller. A similar indicator is associated with each controller for the variable spindle speed mechanism which indicates in revolutions per minute the spindle speed corresponding to the settings of the controller.

The variable speed mechanism for driving the table is operated as herein disclosed by means of the gear shifting levers 12 and 14 mounted on fixed pivots and controlled by the cams 16 and 18 respectively which are secured on the cam shaft 20. The cam shaft is rotated to give the desired variations in the table feed from the rotary controller arm 22 through connections which include the bevel gear 24 which meshes with a bevel gear 26 secured to the end of the shaft 28. The shaft 28 is in turn connected to rotate with a stub shaft 30 on which the rotary controller lever 22 is mounted through the gear 32 secured to the shaft 28 and the gear 34 secured to the stub shaft 30. For convenience in setting the variable speed mechanism and ease of operation, the ratios of the gears 24 and 26, and 32 and 34 are arranged to require one complete revolution of the rotary controller arm 22 for each succeeding adjustment of the variable speed mechanism.

To indicate the rate of feed resulting from the adjustment of the variable speed mechanism in accordance with the number of turns given the rotary controller arm 22, a dial 36 is provided which is secured to the face of an internal gear 38 mounted in the casing 40 for the rotary controller and indicator mechanism. The dial is given one revolution for the total number of revolutions of the rotary controller arm 22 required to complete the cycle of speed changes of the variable speed mechanism for the table feed through gear connections from the stub shaft 30 which comprise a pinion 42 formed on a sleeve 44 loose on the shaft 28 and engaging the internal gear 38. The sleeve 44 also carries a gear 46 meshing with a pinion 48 on the stub shaft 30 which supports the rotary controller arm 22. The dial is provided with graduations which preferably indicate the rate of feed in inches per minute corresponding to the adjustment of the variable speed mechanism, and all the graduations except that corresponding to the settings of the controller are preferably hidden from view under the casing 40 which is provided with a slight opening 50 at which the graduation representing the present adjustment of the variable speed mechanism appears. To secure any given feed, therefore, the operator merely rotates the controller arm until the desired feed appears at the sight opening. The casing 40 may if desired be provided with a table indicating the various feeds which may be secured by adjustment of the controller arm.

The variable speed mechanism may also be controlled by the operator from the front of the machine by means of a rotary controller and indicator dial mounted on the front of the saddle which is in every respect the same as that on the side of the column just described. The controller arm of this controller and indicator mechanism is connected through reduction gears to the forward end of the shaft 52, see Fig. 1, which is mounted on the saddle 8 and has a driving sliding connection with a shaft 54 mounted on the knee 10. The rear end of the shaft 54 is connected by hook joints 56 and an extensible shaft 58 with the forward end of a shaft 60 mounted in the fixed column which is connected by bevel gears 62, 64 to the shaft 28. When either controller and indicator mechanism is operated by the operator, they will both be rotated in unison so that both dials will show the present adjustment of the variable speed mechanism.

Due to the fact that there is almost inevitably a certain amount of play or back lash in the connections above described for actuating one controlling mechanism from the other, difficulty has been encountered in bringing the two controller mechanisms into register with each other so that the operator by manipulating either of the rotary controllers can readily set both mechanisms to indicate the correct feed. A feature of the present invention contemplates the provision of a novel and at the same time simple mechanism which acts automatically to index the two controller and indicator mechanisms accurately with relation to each other. Each rotary controller arm 22 is loosely mounted on a sleeve bearing 70 rigidly secured to its corresponding stub shaft 30 and is held locked in rest position, except when being actually manipulated by the operator, by the engagement of a spring pressed lock bolt 72 with a corresponding recess 74 in the machine frame. A knob or handle 75 is secured to the end of the lock bolt 72 so that it may be readily withdrawn by the operator to permit the operation of the rotary controller, means hereinafter described being provided for rigidly connecting the controller arm 22 to the stub 30 as the lock bolt is withdrawn. With this construction, each rotary controller arm, at all times, except when released by the operator, is held in one fixed position. For each succeeding adjustment of the variable speed gears made by the operator in manipulating either controller device each stub shaft 30 should make exactly one revolution to bring the indicator dials to their proper position and also to exactly position the change gear cams 16 and 18. To index the controller and indicator mechanism remote from the operator at the end of a revolution of the stub shafts 30, a spring plunger 76 having a V-shaped cam surface is mounted within the controller arm 22, and is adapted to engage yieldingly with a corresponding recess 78 formed in the sleeve 70. The spring pressed plunger 76 is normally permitted to retract as the stub shaft 30 is rotated, causing the V-shaped plunger 76 to ride out of its recess 78 and then acts to index the shaft 30 accurately with relation to the controller lever 22 at the end of one revolution so that the stub shaft is returned exactly to its original position.

Either rotary controller arm may be operatively connected to rotate its stub shaft 30 when it is desired to effect an adjustment of the variable table feed by mechanism which acts to hold the spring plunger 76 rigidly in contact with the recess 78. To this end, a locking member or disk 80 is secured to the lock bolt 72 and is adapted when the lock bolt is withdrawn by the operator to engage the rear end of the spring plunger 76 thus holding it rigidly in advanced position.

When the handle 75 is released by the operator, the lock bolt 72 acting under the influence of its spring will move forward again carrying with it the cam 80 and so releasing the spring plunger 76. Inasmuch as it is undesirable to permit the rotary controller lever to be disconnected from the stub shaft 30 in case the operator releases the knob 75 before the controller arm 22 has made a complete revolution to set the change feed cams to produce the desired speed, means are provided which act upon turning the rotary controller arm 22 to hold the spring plunger 76 in the recess 78 to lock the rotary controller lever 22 to the stub shaft 30. This mechanism comprises a fixed ring 82 surrounding the collar 70 and adapted to ride in a corresponding groove 84 formed in the spring plunger 76. The ring is provided with a recess 86 so that in the rest position of the rotary controller arm 22 the spring plunger is free to move out of contact with the recess 78 to permit the stub shaft 30 with the collar 70 to move independently of the rotary controller arm 22.

The nature and scope of the invention having been indicated and one embodiment thereof having been described, what is claimed is:—

1. In a machine tool the combination with a variable speed mechanism of a plurality of variable speed controller mechanisms located at different points on the machine each comprising a shaft rotatable to effect succeeding adjustments of the variable speed mechanism, means for correcting the position of the shaft to bring it into an exact angular position for each adjustment of the variable speed mechanism, a manually operable rotary controller mounted to turn on the shaft, an indicator dial, connections for causing each dial to indicate the present adjustment of the variable speed mechanism, and means controlled by the operator to positively connect the rotary controller to rotate the shaft.

2. In a machine tool the combination with a variable speed mechanism of a plurality of variable speed controller mechanisms located at different points on the machine each comprising a shaft rotatable to effect succeeding adjustments of the variable speed mechanism, a manually operable rotary controller mounted to turn thereon, means for indicating the present adjustment of the variable speed mechanism, means controlled by the operator to positively connect the rotary controller to rotate the shaft, and means out of the control of the operator to maintain the connection until the rotation of the shaft to effect an adjustment has been completed.

3. In a machine tool the combination with a variable speed mechanism of a plurality of variable speed controller mechanisms located at different points on the machine each comprising a shaft rotatable to effect succeeding adjustments of the variable speed mechanism, a manually operable rotary controller mounted to turn thereon, means for indicating the present adjustment of the variable speed mechanism, means for locking the rotary controller against movement with the shaft, and means rendered operative upon releasing the rotary controller to operatively connect the shaft to turn therewith.

4. In a machine tool the combination with a variable speed mechanism of a plurality of variable speed controller mechanisms located at different points on the machine each comprising a shaft rotatable to effect succeeding adjustments of the variable speed mechanism, a manually operable rotary controller mounted to turn thereon, means for connecting the controller to the shaft, means for indicating the present adjustment of the variable speed mechanism, means for locking the rotary controller when not being moved by the operator against movement with the shaft, and means acting at each speed adjustment of the variable speed mechanism to cause the shaft to assume an exact angular relation to the rotary controller.

5. In a machine tool the combination with a variable speed mechanism of a plurality of variable speed controller mechanism located at different points on the machine each comprising a shaft rotatable through a predetermined angle for each succeeding adjustment of the variable speed mechanism, a manually operable rotary controller mounted to turn thereon, an indicator dial, connections for causing each dial to indicate the present adjustment of the variable speed mechanism, means for locking the rotary controller in a predetermined angular position, a yielding cam connection for indexing the shaft with relation to the rotary controller to cause the controller mechanism to correspond exactly to the present speed adjustment of the variable speed mechanism, and means actuated upon releasing the rotary controller to render the cam connection rigid to connect the shaft to turn with the rotary controller.

6. In a machine tool the combination with a variable speed mechanism of a plurality of variable speed controller mechanisms located at different points on the machine each comprising a manually operable rotary controller adapted to effect succeeding adjustments of the variable speed mechanism, means for indicating the present adjustment of the variable speed mechanism, means controlled by the operator for rendering the rotary controller active to change the adjustment of the variable speed mechanism, and means for indexing each controller mechanism to correspond exactly to the adjustment of the variable speed mechanism.

7. In a machine tool the combination with a variable speed mechanism of a variable speed controller mechanism comprising a manually operable rotary controller, mechanism including a gear train through which each revolution of the controller effects one succeeding adjustment in a cycle of adjustments of the variable speed mechanism, means for holding the rotary controller in the same rest position to which it is returned after each adjustment of the variable speed mechanism, an indicator dial, connections for indexing the variable speed mechanism with relation to the rotary controller in its rest position, and mechanism controlled from the rotary controller for causing the dial to indicate the adjustment of the variable speed mechanism.

8. In a machine tool the combination with a variable speed mechanism of a plurality of variable speed controller mechanisms located at different points on the machine each comprising a manually operable rotary controller and an indicator dial, connections for causing each dial to indicate the adjustment of the variable speed mechanism, means for indexing each controller mechanism independently for each speed adjustment to correspond exactly with the variable speed adjustment, and means controlled by the operator for rendering the rotary controller operative to adjust the variable speed mechanism.

9. In a machine tool the combination with a variable speed mechanism of a plurality of variable speed controller mechanisms located at different points on the machine each comprising a manually operable rotary controller adapted for each revolution of the controller to effect one succeeding adjustment in the cycle of adjustments of the variable speed mechanism, means for indicating the present adjustment of the variable speed mechanism, means for locking the rotary controller against rotation during the adjustment of the variable speed controller mechanism by another controller, and means controlled by the operator for rendering the rotary controller active to adjust the variable speed mechanism.

10. In a machine tool the combination with a variable speed mechanism of a plurality of variable speed controller mechanisms located at different points on the machine each comprising a manually operable rotary controller adapted to effect succeeding adjustments of the variable speed mechanism, means for indicating the present adjustment of the variable speed mechanism, means for locking the rotary controller against rotation during the adjustment of the variable speed controller mechanism by another controller, and means controlled by the operator for rendering the rotary controller active to adjust the variable speed mechanism.

11. In a machine tool the combination with a variable speed mechanism of a plurality of variable speed controller mechanisms located at different points on the machine each comprising a manually operable rotary controller adapted to effect succeeding adjustments of the variable speed mechanism, means for indicating the present adjustment of the variable speed mechanism, means for locking the rotary controller against movement during the adjustment of the variable speed controller mechanism by another controller, means controlled by the operator for rendering the rotary controller operative to adjust the variable speed mechanism, and means for indexing each controller mechanism to correspond exactly to the adjustment of the variable speed mechanism.

12. In a machine tool the combination with a variable speed mechanism of a plurality of variable speed controller mechanisms located at different points on the machine each comprising a manually operable rotary controller adapted to effect succeeding adjustments of the variable speed gearing, means for indicating the present adjustment of the variable speed mechanism, a shaft forming part of the controller mechanism on which the rotary controller is mounted to turn, a spring pressed cam carried by the rotary controller for indexing the shaft with relation to the rotary controller, a lock bolt carried on the rotary controller to lock the rotary controller against movement with the shaft, and means rendered active by withdrawing the lock bolt to lock the cam to operatively connect the rotary controller with the shaft.

13. In a machine tool the combination with a variable speed mechanism of a plurality of variable speed controller mechanisms located at different points on the machine each comprising a manually operable rotary controller adapted to effect succeeding adjustments of the variable speed mechanism and means for indicating the present adjustment of the variable speed mechanism, a shaft forming part of the controlling mechanism on which the rotary controller is mounted to turn a spring pressed cam carried by the rotary controller, a lock bolt carried on the rotary controller to lock the rotary controller against movement with the shaft, a locking member actuated by the movement of the lock bolt holding the spring pressed cam to operatively connect the rotary controller with the shaft, and a locking ring adapted to lock the spring pressed cam in position during the movement of the rotary controller.

14. In a machine tool the combination with a variable speed mechanism of a plurality of variable speed controller mechanisms located at different points on the machine each comprising a shaft rotatable to effect succeeding adjustments of the variable speed mechanism, a manually operable rotary controller mounted to turn thereon, means for indicating the present adjustment of the variable speed mechanism, a V-shaped spring pressed plunger carried by the rotary controller and adapted to engage a corresponding recess on the shaft, a lock bolt carried on the rotary controller to lock the rotary controller against movement with the shaft, means rendered active by the operator in withdrawing the lock bolt to hold the plunger in contact with the recess, and a locking ring adapted to lock the plunger in its recess during the rotation of the rotary controller.

15. In a machine tool the combination with a variable speed mechanism of a plurality of variable speed controller mechanisms located at different points on the machine, each comprising a shaft rotatable through one revolution for each succeeding adjustment in a cycle of adjustments of the variable speed mechanism, means for indicating the present adjustment of the variable speed mechanism, a manually operable rotary controller loosely mounted on each shaft, means for connecting the rotary controller to rotate the shaft, and means for holding the rotary controller when out of operation in the same predetermined angular position on the machine.

16. In a machine tool the combination with a variable speed mechanism of a plurality of variable speed controller mechanisms located at different points on the machine, each comprising a shaft rotatable through one revolution for each succeeding adjustment in a cycle of adjustments of the variable speed mechanism, means for indicating the present adjustment of the variable speed mechanism, a manually operable rotary controller loosely mounted on each shaft, means for connecting the rotary controller at a predetermined angular position on the shaft, and means for determining the stop position of the controller to secure an accurate adjustment of the variable speed mechanism.

In testimony whereof I have signed my name to this specification.

BENJAMIN P. GRAVES.